US010148825B2

(12) United States Patent
Vasudevan et al.

(10) Patent No.: US 10,148,825 B2
(45) Date of Patent: Dec. 4, 2018

(54) CHARGING FOR REROUTED PACKETS IN A HETEROGENEOUS WIRELESS COMMUNICATION SYSTEM

(71) Applicants: Alcatel-Lucent USA Inc., Murray Hill, NJ (US); Alcatel Lucent, Boulogne-Billancourt (FR)

(72) Inventors: Subramanian Vasudevan, Morristown, NJ (US); Satish Kanugovi, Bangalore (IN)

(73) Assignee: Nokia of America Corporation, Murray Hill, NJ (US)

( * ) Notice: Subject to any disclaimer, the term of this patent is extended or adjusted under 35 U.S.C. 154(b) by 0 days.

(21) Appl. No.: 15/217,686

(22) Filed: Jul. 22, 2016

(65) Prior Publication Data

US 2017/0070617 A1 Mar. 9, 2017

Related U.S. Application Data

(60) Provisional application No. 62/216,120, filed on Sep. 9, 2015.

(51) Int. Cl.

| | |
|---|---|
| ***H04M 15/00*** | (2006.01) |
| ***H04W 72/04*** | (2009.01) |
| ***H04W 28/02*** | (2009.01) |
| ***H04W 28/08*** | (2009.01) |
| *H04L 12/14* | (2006.01) |
| *H04L 12/24* | (2006.01) |
| *H04W 36/00* | (2009.01) |

(52) U.S. Cl.

CPC ........ *H04M 15/60* (2013.01); *H04L 12/1435* (2013.01); *H04W 28/0268* (2013.01); (Continued)

(58) Field of Classification Search

CPC ............... H04M 15/60; H04L 12/1435; H04L 12/1407; H04L 12/1496; H04L 41/0896; (Continued)

(56) References Cited

U.S. PATENT DOCUMENTS

2004/0152439 A1* 8/2004 Kimura .................. H04L 69/16 455/403

2011/0075675 A1 3/2011 Koodli et al.

(Continued)

FOREIGN PATENT DOCUMENTS

WO 2013166679 11/2013

OTHER PUBLICATIONS

Elsherif, et al., "Resource Allocation and Inter-Cell Interfence Management for Dual-Access Small Cells", IEEE Journal on Selected Areas in Communications, vol. 33, No. 6, Jun. 2015, 15 pages.

Qualcomm, "Consideration on LTE-WLAN Interworking Architecture", 3GPP RAN #67, Mar. 9-12, 2015, 8 pages.

International Search Report and Written Opinion correlating to PCT/US216/050360, dated Nov. 28, 2016, 13 pages.

(Continued)

*Primary Examiner* — Peter Cheng

(57) ABSTRACT

A base station receives packets at a base station in a first network that operates according to a first radio access technology (RAT). The base station selectively routes a portion of the packets towards one or more second networks that operates according to one or more second RATs and transmits information indicating a number of packets in the portion of the packets. The gateway receives the information indicating the number of packets from the base station, determines charging information based on the information indicating the number of packets, and transmits the charging information to a charging entity in the first network.

17 Claims, 8 Drawing Sheets

(52) U.S. Cl.
CPC ......... *H04W 28/08* (2013.01); *H04W 72/042* (2013.01); *H04W 72/0413* (2013.01); *H04L 12/1407* (2013.01); *H04L 12/1496* (2013.01); *H04L 41/0896* (2013.01); *H04L 41/5029* (2013.01); *H04W 36/005* (2013.01)

(58) Field of Classification Search
CPC .......... H04L 41/5029; H04W 28/0268; H04W 28/08; H04W 72/0413; H04W 72/042; H04W 36/005
USPC .......................................................... 370/329
See application file for complete search history.

(56) References Cited

U.S. PATENT DOCUMENTS

| | | | | |
|---|---|---|---|---|
| 2014/0119242 | A1 | 5/2014 | Campbell | |
| 2014/0204771 | A1* | 7/2014 | Gao | H04W 36/28<br>370/252 |
| 2015/0092743 | A1* | 4/2015 | Ji | H04W 76/026<br>370/331 |
| 2015/0295833 | A1* | 10/2015 | Mizukoshi | H04L 47/125<br>370/235 |
| 2016/0255539 | A1* | 9/2016 | Mizukoshi | H04W 36/0072<br>370/329 |

OTHER PUBLICATIONS

International Preliminary Report on Patentability correlating to PCT/US2016/050360, dated Mar. 13, 2018, 7 pages.

* cited by examiner

CHARGING FOR REROUTED PACKETS IN A HETEROGENEOUS WIRELESS COMMUNICATION SYSTEM

CROSS REFERENCE TO RELATED APPLICATIONS

This application claims priority to U.S. Provisional Patent Application 62/216,120, filed on Sep. 9, 2015.

BACKGROUND

Field of the Disclosure

The present disclosure relates generally to wireless communication systems and, more particularly, to charging users for resource usage in a wireless communication system.

Description of the Related Art

Heterogeneous wireless communication systems include base stations and access points that operate according to different radio access technologies (RATs). For example, a heterogeneous wireless communication system may include Wi-Fi access points that operate according to IEEE 802.11 standards in unlicensed frequency bands or base stations that operate in licensed frequency bands according to standards such as Long Term Evolution (LTE) standards defined by the Third Generation Partnership Project (3GPP). The Wi-Fi access points may operate according to IEEE Std 802.11ac™-2013 or IEEE Std 802.11n™-2009, which are incorporated herein by reference in their entirety. Unlicensed frequency bands are portions of the radiofrequency spectrum that do not require a license for use and may therefore be used by any device to transmit or receive radiofrequency signals. For example, the Unlicensed National Information Infrastructure (UNII) is formed of portions of the radio spectrum that include frequency bands in the range of 5.15 GHz to 5.825 GHz. For another example, the industrial, scientific, and medical (ISM) radio bands are portions of the radio spectrum that are reserved internationally for unlicensed communication. The ISM radio bands include bands with a center frequency of 2.4 GHz and a bandwidth of 100 MHz, a center frequency of 5.8 GHz and a bandwidth of 150 MHz, and a center frequency of 24.125 GHz and a bandwidth of 250 MHz, among other frequency bands. Unlicensed frequency bands can be contrasted to licensed frequency bands that are licensed to a particular service provider and may only be used for wireless communication that is authorized by the service provider.

The base stations and access points may be implemented as parts of different networks. For example, LTE base stations are implemented in a corresponding LTE network and Wi-Fi access points are implemented in a corresponding wireless local access network (WLAN). The different networks may be interconnected by one or more interfaces or routers. For example, the Wi-Fi access points and LTE base stations may be co-located, implemented in a single physical entity, or connected by an Internet Protocol (IP) routable path so that information can be communicated between the Wi-Fi access points and LTE base station on the basis of their corresponding IP addresses. User equipment and the heterogeneous wireless communication system may therefore communicate with either the LTE base stations or the Wi-Fi access points of the corresponding air interfaces. User equipment typically implement multiple radios for transmitting or receiving signals in the licensed or unlicensed frequency bands. For example, user equipment may include a LTE-L radio to transmit and receive signals in the licensed frequency bands according to LTE, an LTE-U radio to transmit and receive signals in the unlicensed frequency bands according to LTE, and a Wi-Fi radio to transmit and receive signals in the unlicensed frequency bands according to Wi-Fi.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
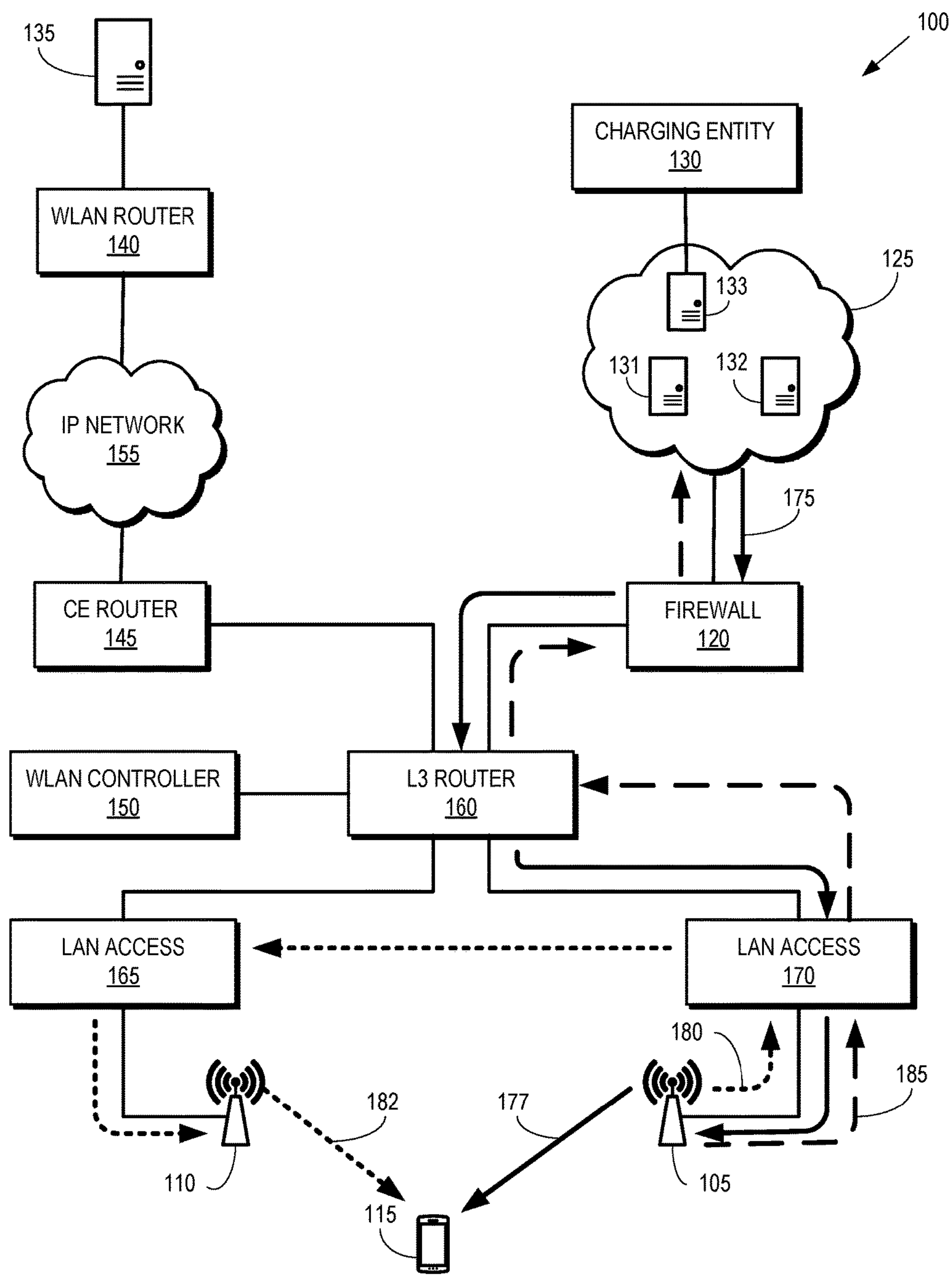
FIG. 1 is a block diagram of a wireless communication system that conveys downlink packets according to some embodiments.

Network integration schemes, such as Wi-Fi Boost, allow a base station to selectively route uplink or downlink packets to a destination user equipment over an LTE interface supported by the base station or through a sideways link to an access point that communicates with the destination user equipment over a Wi-Fi interface. For example, a PGW in the LTE network may transmit a stream of downlink packets to the base station. The downlink packets are addressed to a destination user equipment served by the base station. The base station transmits a first portion of the downlink packets over an LTE interface to the destination user equipment and reroutes a second portion of the downlink packets to the access point, which transmits the second portion of the downlink packets over a Wi-Fi interface to the destination user equipment. For another example, the access point may receive downlink packets from the Wi-Fi network and transmit the downlink packets to a destination user equipment over a Wi-Fi interface. The user equipment may respond by transmitting uplink packets to the base station over an LTE interface and the base station may reroute the received uplink packets to the Wi-Fi network along a path that bypasses the PGW in the LTE network.

Networks that operate according to different RATs typically apply different charging rates to the packets transmitted through the networks. For example, a mobile network operator of an LTE network may charge a fee for each packet that is transmitted over the uplink or downlink, either by charging for each byte that is transmitted or by charging a flat fee to transmit a predetermined amount of information such as 10 gigabytes (GB). The uplink or downlink packets that are transmitted using the LTE network are typically counted at a Packet Data Node (PDN) gateway (PGW) in the LTE network, which can provide information to a charging system to indicate the number of bytes consumed by packets associated with each user. For another example, a mobile network operator of a Wi-Fi network may not charge a fee for packets that are transmitted over the uplink or downlink of the Wi-Fi network, or the mobile network operator may charge a reduced fee relative to the fees for using an LTE network.

Charging entities in conventional networks do not account for the possibility that uplink or downlink packets are routed over air interfaces that operate according to different RATs. For example, a conventional PGW in an LTE network assumes that all downlink packets transmitted to a base station are subsequently transmitted over the LTE interface to the destination user equipment. The user is therefore charged for each downlink packet at LTE rates even though some of the downlink packets may have been selectively routed (or rerouted) for transmission over the Wi-Fi interface. For another example, uplink packets that are received at the base station over the LTE interface and then routed to the Wi-Fi network are not received by the PGW, which therefore cannot count the uplink packets or charge the user for the consumed resources of the LTE interface.

Users can be accurately charged for resource consumption in a heterogeneous wireless communication system that includes a base station in a first network that operates according to a first radio access technology (RAT) such as LTE and an access point in a second network that operates according to a second RAT such as Wi-Fi by counting, at the base station, a first number of packets that are routed from the base station towards the first network for transmission through the first network and a second number of packets that are routed from the base station towards the second network for transmission through the second network. A number of packets corresponding to the first number, the second number, or a combination thereof is then transmitted over an uplink from the base station to a gateway in the first network such as a Packet Data Node (PDN) gateway (PGW) in an LTE network. The packets that are transmitted to the gateway may be referred to as “charging-only” packets because they convey information such as a user identifier and the byte count that are used to charge users for the resources consumed by other packets in the first or second networks. However, the charging-only packets do not include data that is destined for any other entity. Thus, charging-only packets may be configured so that they are not propagated beyond the gateway. The gateway can generate charging information for each user based on the charging-only packets and, in some cases, a third number of packets counted by the gateway. The gateway can then forward the charging information to a charging entity that charges the user for resource consumption in the LTE network.

Charging for downlink packets may be performed in two modes: (1) a mode that is anchored at gateway such as a PGW in an LTE network and (2) a “zero-rate” mode in which the PGW does not count downlink packets and determines charging based only on uplink packets received from the base station. A PGW operating in the first mode counts a (third) number of downlink packets that are provided to a base station for transmission to a destination user equipment. The base station counts a second number of packets that are routed to an access point for transmission over a Wi-Fi interface to the destination user equipment. The base station then transmits charging-only packets to the PGW, which discounts the third number of downlink packets based on the charging-only packets. In the second mode, the PGW does not count the downlink packets that are provided to the base station. The base station counts a first number of packets that are transmitted over the LTE air interface to the destination user equipment and a second number of packets that are routed to an access point for transmission over a Wi-Fi interface to the destination user equipment. The base station determines a number of charging-only packets based on the first and second numbers of packets and then transmits this number of charging-only packets to the PGW, which determines how much the user should be charged for the downlink packets based on the received number of charging-only packets. Some embodiments of the base station scale the second number of packets that were transmitted over the Wi-Fi interface so that each charging-only packet transmitted to the PGW represents more than one downlink packet transmitted over the Wi-Fi interface.

Charging for uplink packets can be determined when the base station is operating in the local access mode, in which packets that are received over the LTE interface and then routed to the Wi-Fi network, by counting the uplink packets that the base station received over the LTE interface and then routed to the Wi-Fi network. The re-routed uplink packets bypass the PGW and consequently are not included in the uplink packet count used to determine usage charges for the user. The base station therefore transmits a number of charging-only packets that corresponds to the number of re-routed uplink packets to the PGW, which determines a charge for the user based on the charging-only packets. In some embodiments, instead of charging-only packets, control messages or control signaling including parameters such as a byte count and an associated quality-of-service (QoS) can be transmitted to identify the rerouted packets and determine the appropriate charging rate.

FIG. 1 is a block diagram of a wireless communication system 100 that conveys downlink packets according to some embodiments. The wireless communication system 100 includes a base station 105 that operates according to a first radio access technology (RAT) such as Long Term Evolution (LTE) standards defined by the Third Generation Partnership Project (3GPP). The wireless communication system 100 also includes an access point 110 that operates according to a second RAT such as Wi-Fi, which is defined according to IEEE 802.11 standards. The terms “base station” and “access point” are used herein to distinguish between devices that operate in different networks and provide wireless connectivity according to different RATs. However, these terms may be used interchangeably and may also refer to other devices such as base station routers, macrocells, metrocells, microcells, picocells, femtocells, and the like. Some embodiments of the base station 105 or the access point 110 may operate according to fifth-generation (or 5G) standards for wireless communication. The 5G standards may specify data rates of tens of megabits per second that can be supported for tens of thousands of concurrent users, several hundreds of thousands of simultaneous connections, improved spectral efficiency relative to LTE, reduce latency relative to LTE, and the like. Although FIG. 1 illustrates two networks that operate according to two different RATs, some embodiments of the wireless communication system 100 may implement additional base stations or access points in one or more additional networks to provide wireless connectivity according to more than two RATs.

The base station 105 and the access point 110 can transmit packets to one or more user equipment 115 or receive packets from the user equipment 115 over an air interface according to their respective RATs. Examples of user equipment 115 include wireless communication devices that operate according to LTE, machine-to-machine (M2M) devices, smart phones, mobile terminals, wireless-enabled tablets, wireless network interface cards, Wi-Fi sticks, radio transceivers integrated with sensors, 5G transceivers, 5G radio terminals, and the like.

The wireless communication system 100 includes a first network that operates according to the first RAT such as an LTE network. Some embodiments of the LTE network include a firewall 120, a server network 125, and a charging entity 130. The LTE network also includes the base station 105. The firewall 120 monitors and controls uplink and downlink packets based on security rules implemented in the firewall 120. The server network 125 includes a security gateway 131, a serving gateway 132, and a Packet Data Network (PDN) gateway 133. The security gateway 131 may be used to implement security protocols such as Internet Protocol security (IPSec) for packets that are transmitted to and from the server network 125. The serving gateway 132 implements control and data plane stacks to support interfaces with a mobility management entity (not shown in FIG. 1), the PDN gateway 133, the base station 105, and other entities. The PDN gateway 133 implements control and data plane stacks to support interfaces with the serving gateway 132. Uplink and downlink packets associated with the base station 105 pass through the PDN gateway 133 and some embodiments of the PDN gateway 133 count the packets and generate charging information indicating the number of uplink or downlink packets. Counting the packets may also include determining the number of bytes conveyed by or associated with each packet. The charging information is provided to the charging entity 130 that uses a set of rules, policies, and procedures to charge the owner of the user equipment 115 for resources of the air interface that are consumed by the packets.

The wireless communication system 100 includes a second network that operates according to the second RAT such as a Wi-Fi network. Some embodiments of the Wi-Fi network include an application server 135, a Wide Area Local Access Network (WLAN) router 140, a customer edge (CE) router 145 and a WLAN controller 150. The Wi-Fi network also includes the access point 110. The application server 135 supports applications such as Google Hangout, Lync, and the like. The WLAN router 140 is used to route uplink or downlink packets between the application server 135 and other routers in the Wi-Fi network such as the CE router 145 via an IP network 155. The CE router 145 is used to route uplink or downlink packets associated with the access point 110, as well as other entities such as other access points. For example, the WLAN router 140 and the CE router 145 may route uplink or downlink packets on the basis of IP addresses in the packets. Some embodiments of the WLAN controller 150 may be used to provide the proper IP addresses for correct routing of the packets.

An access network is used to interconnect the LTE network and the Wi-Fi network. Some embodiments of the access network include an L3 router 160, a LAN access 165, and a LAN access 170. Data, control signaling information, or a combination thereof may be routed to the access network based on IP addresses in the packets that include the data or control signaling information. For example, downlink packets can be routed from the PDN gateway 133 through the LTE network to the base station 105 for transmission to the user equipment 115 on the basis of an IP address of the base station 105 or the user equipment 115. For another example, downlink packets can be routed from the application server 135 through the Wi-Fi network to the access point 110 for transmission to the user equipment on the basis of an IP address of the access point 110 or the user equipment 115.

The PDN gateway 133 provides downlink packets to the base station 105 via the LTE network. For example, the downlink packets may pass through the firewall 120 to the L3 router 160, which was the downlink packets to the LAN access 170 for provision to the base station 105, as indicated by the solid arrows 175 (only one of the solid arrows is indicated by the reference numeral in the interest of clarity). The base station 105 provides a first portion of the downlink packets to the user equipment 115 over the air interface 177. The base station 105 may also route a second portion of the downlink packets to the access point 110 in the Wi-Fi network via the LAN accesses 165, 170, as indicated by the short dashed arrows 180 (only one of the short dashed arrows is indicated by the reference numeral in the interest of clarity). The access point 110 provides the second portion of the downlink packets to the user equipment over the air interface 182.

Usage costs for the resources of the LTE network (e.g., the air interface 177) may differ from the usage costs for the resources of the Wi-Fi network (e.g., the air interface 182). The base station 105 may therefore provide charging-only packets to the PDN gateway 133, as indicated by the long dashed arrows 185 (only one of the long dashed arrows as indicated by the reference numeral in the interest of clarity). The charging-only packets are used to indicate numbers of packets (or numbers of bytes) that are routed through the LTE network and the numbers of packets (or numbers of bytes) that are routed through the Wi-Fi network. Some embodiments of the charging-only packets include information indicating that the charging-only packet indicates charging information for a downlink packet that was routed through the Wi-Fi network, a byte count that indicates numbers of bytes in the rerouted packets, an identifier of the user equipment 115, and an expiry that causes the charging-only packet to expire after reception by the PDN gateway 133.

In some embodiments, the number of charging-only packets transmitted to the PDN gateway 133 depends on an operating mode of the PDN gateway 133. For example, the PDN gateway 133 may operate in a "gateway anchored" mode in which the PDN gateway 133 counts the downlink packets that are transmitted to the base station 105. The PDN gateway 133 may also keep track of the number of bytes that are transmitted in the downlink packets. When the PDN gateway 133 is operating in the gateway anchored mode, the base station 105 counts the number of packets that are rerouted through the Wi-Fi network to the access point 110 and transmits a number of charging-only packets that is determined based on the number of rerouted packets. The PDN gateway 133 uses the information in the charging-only packets to modify charging information that is provided to the charging entity 130. For example, the PDN gateway 133 may determine a base charge using the number of downlink packets (or number of bytes in the downlink packets) that are initially transmitted to the base station 105. The PDN gateway 133 may then modify the base charge using the charging-only packets received from the base station 105. For example, the PDN gateway 133 may reduce the base charge based on a difference between the charging rate for the LTE network and the charging rate for the Wi-Fi network. For another example, the PDN gateway 133 may operate in a "zero rate" mode in which the PDN gateway 133 does not count the downlink packets that are transmitted to the base station 105. When the PDN gateway 133 is operating in the zero rate mode, the base station 105 counts the number of packets that are transmitted over the air interface 177 and the number of packets that are rerouted through the Wi-Fi network to the access point 110. The base station 105 may then transmit charging-only packets corresponding to the number of packets transmitted over the air interface 177 and charging-only packets corresponding to the number of packets that are rerouted to the Wi-Fi network. The PDN gateway 133 may then use the two sets of charging-only packets to determine charging information based on the (potentially) different charging rates for the LTE network and the Wi-Fi network.

Some embodiments of the charging-only packets include information that indicates the user that is to be charged for transmission of the packets, the quality-of-service (QoS) or the QoS Class Identifier (QCI) of the packets that were offloaded are rerouted through the Wi-Fi network to the access point 110. For example, the charging-only packet corresponding to a rerouted downlink packet may include a 6-bit differentiated services code point (DSCP) value in a field of an Internet Protocol (IP) header of the downlink packet. For another example, the charging-only packet corresponding to the rerouted downlink packet may include a 32-bit tunnel endpoint identifier (TEID) that is used to multiplexed different connections into a tunnel that operates according to the General Packet Radio Service (GPRS) Tunnel Protocol (GTP).

Bandwidth in the wireless communication system 100 may be conserved by generating one charging-only packet to represent more than one downlink packet. Some embodiments of the base station 105 and the PDN gateway 133 negotiate a protocol that determines a scaling factor for mapping the charging-only packets to the downlink packets. For example, a scaling factor, $d<1$, may be defined so that the PDN gateway 133 maps each received charging-only packet to $1/d$ downlink packets that were provided to the base station 105. In cases where a single charging-only packet represents more than one downlink packet, the charging-only packet may include information that indicates the QoS or QCI of each of the downlink packets.

Instead of transmitting charging-only packets, the base station 105 may transmit other information that represents the downlink packets that were rerouted through the Wi-Fi network to the access point 110. In some embodiments, the base station 105 transmits control messages or control signaling to identify the rerouted downlink packets. The control messages or control signaling may include information used to determine the appropriate charging rate for the rerouted downlink packets. For example, the control messages or control signaling may include information indicating whether the control message or control signaling corresponds to an uplink packet or a downlink packet and whether the base station routed the corresponding packet through the first network (e.g., an LTE network) or the second network (e.g., a Wi-Fi network). The control message or control signaling may also include a byte count for the rerouted downlink packet or, in the case that the control message or control signaling represents more than one rerouted downlink packet, the total number of bytes conveyed by the rerouted downlink packets. The control message or control signaling may include information that indicates a quality-of-service (QoS) level for the rerouted downlink packet, which may be used to determine a charging rate for the rerouted downlink packet. The control message or control signaling may also include information indicating a value of a discounted rating enable indicator (DREI). A first value of the DREI indicates that the PDN gateway is operating in the gateway anchored mode and a second value of the DREI indicates that the PDN gateway is operating in the zero rate mode. The control message or control signaling may also include information, such as an IP address, that identifies the user equipment that transmitted or received the corresponding packet.

Figure 2:
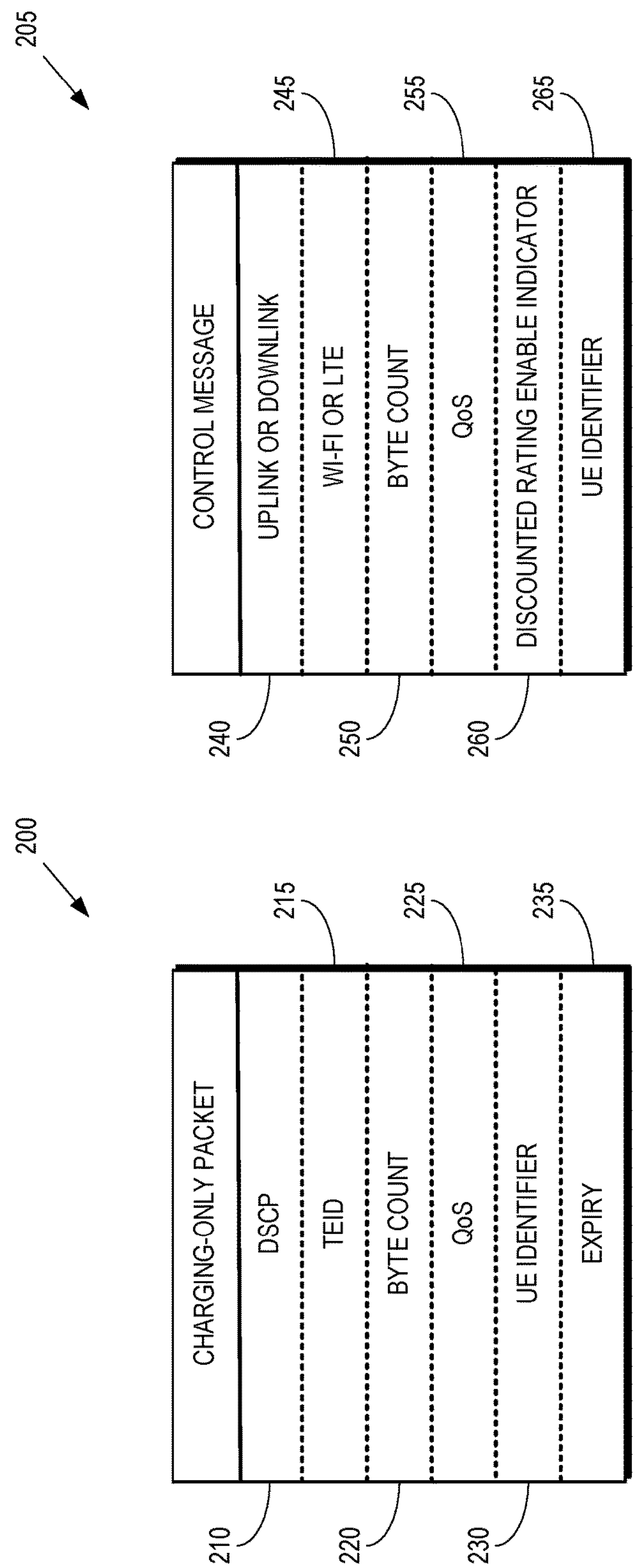
FIG. 2 is an illustration of a charging-only packet that may be transmitted by a base station in a first network to indicate a number of packets that has been rerouted through a second network according to some embodiments.

FIG. 2 is an illustration of a charging-only packet 200 and a control message 205 that may be transmitted by a base station in a first network to indicate a number of packets that has been rerouted through a second network according to some embodiments. The charging-only packet 200 or the control message 205 may be transmitted by some embodiments of the base station 105 shown in FIG. 1.

The charging-only packet 200 may include a field 210 that includes a value that indicates a DSCP value of the corresponding rerouted downlink packet or packets. The charging-only packet 200 may also include a field 215 that indicates a TEID value of the corresponding rerouted downlink packet or packets. The charging-only packet 200 may also include a field 220 that indicates a byte count associated with the rerouted downlink packet or packets. The charging-only packet 200 may also include a field 225 that indicates a quality-of-service (QoS) level for the packet, which may be used to determine a charging rate for the packet. The charging-only packet 200 may also include a field 230 that identifies the user equipment that transmitted or received the corresponding packet. The charging-only packet 200 may also include a field 235 that includes a value of an expiry that indicates that the charging-only packet 200 expires upon reception by the gateway and should not be transmitted further in the network. Some embodiments of the charging-only packet 200 include a subset of the fields 210, 215, 220, 225, 230, 235. For example, the charging-only packet 200 may only include the DSCP field 210, the byte count field 220, the UE identifier 230, and the expiry 235.

The control message 205 may include a field 240 that includes information indicating whether the corresponding packet was an uplink packet or a downlink packet. The control message 205 may also include a field 245 that indicates whether the corresponding packet was routed through the LTE network or rerouted through the Wi-Fi network. The control message 205 may also include a field 250 that indicates a byte count associated with the corresponding packet. The control message 205 may also include a field 255 that indicates a QOS associated with the corresponding packet. The control message 205 may also include a DREI value that indicates whether discounted rating is enabled or disabled, as discussed herein. The control message 205 may also include a UE identifier 265 such as an IP address of the user equipment that transmitted or received the corresponding packet.

Figure 3:
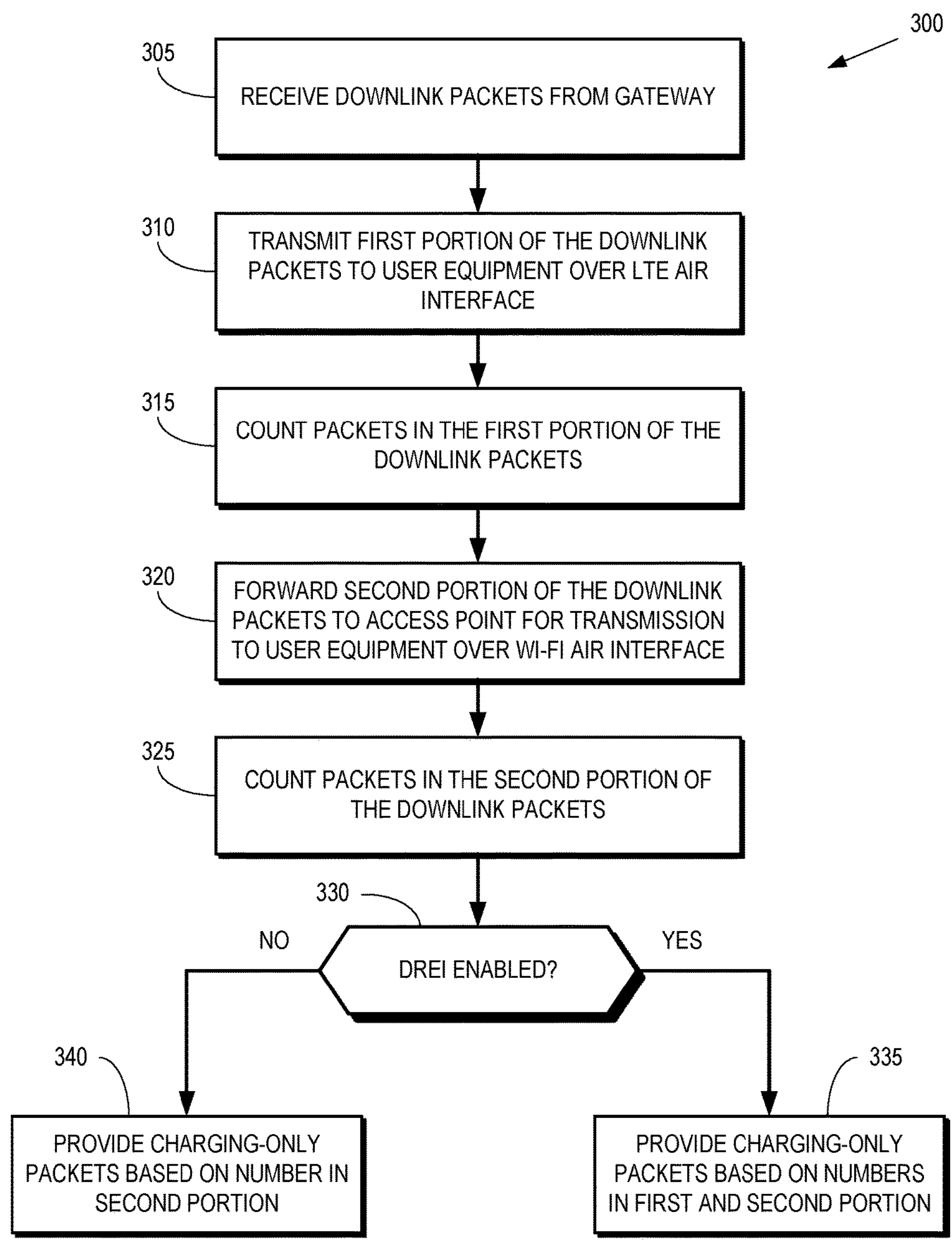
FIG. 3 is a flow diagram of a method for generating charging-only packets based on downlink packets received at a base station from a gateway according to some embodiments.

FIG. 3 is a flow diagram of a method 300 for generating charging-only packets based on downlink packets received at a base station from a gateway according to some embodiments. The method 300 may be implemented in some embodiments of the wireless communication system 100 shown in FIG. 1. Although charging-only packets are used to convey information indicating the number of rerouted downlink packets in the method 300 shown in FIG. 3, control messages or control signaling may also be used to convey this information, as discussed herein.

At block 305, the base station receives downlink packets from a gateway. The downlink packets are addressed to a user equipment. At block 310, the base station transmits a first portion of the downlink packets to the user equipment over an LTE air interface. At block 315, the base station counts the number of downlink packets in the first portion of the downlink packets. The base station may also count the number of bytes in the downlink packets in the first portion. At block 320, the base station forwards a second portion of the downlink packets to an access point in a Wi-Fi network, e.g., by routing the second portion of the downlink packets through an access network that interconnects the LTE network and the Wi-Fi network. At block 325, the base station counts the number of packets in the second portion of the downlink packets. The base station may also count the number of bytes in the downlink packets in the second portion.

At decision block 330, the base station determines whether DREI is enabled at the gateway. The base station may make this determination based on control signaling received from the gateway. If the base station determines that DREI is enabled so that the gateway does not count the downlink packets before providing them to the base station, the base station provides (at block 335) charging-only packets based on the number of downlink packets in the first portion and the number of downlink packets in the second portion. If the base station determines that DREI is not enabled and the gateway is counting the downlink packets before providing them to the base station, the base station provides (at block 340) charging-only packets based only on the packets in the second portion of the downlink packets. In some embodiments, the base station may evaluate whether DREI is enabled at different points of the method 300. For example, the base station made evaluate whether DREI is enabled prior to counting the packets in the first or second portions so that only the packets in the second portion are counted in the event that DREI is not enabled.

Figure 4:
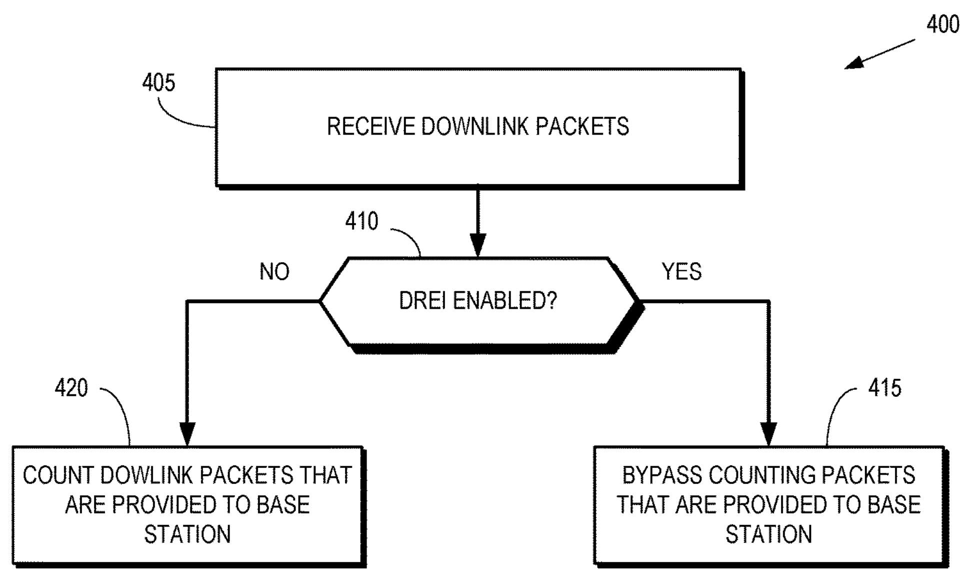
FIG. 4 is a flow diagram of a method of counting downlink packets at a gateway before providing the downlink packets to a base station according to some embodiments.

FIG. 4 is a flow diagram of a method 400 of counting downlink packets at a gateway before providing the downlink packets to a base station according to some embodiments. The method 400 may be implemented in some embodiments of the wireless communication system 100 shown in FIG. 1. At block 405, the gateway receives downlink packets that are addressed to a user equipment. At decision block 410, the gateway determines whether DREI is enabled. If so, the gateway bypasses counting the downlink packets (at block 415) and forwards the downlink packets to the base station for transmission over the air interface to the user equipment or selective routing to an access point via another network. If DREI is not enabled, the gateway counts the downlink packets (at block 420) and provide the downlink packets to the base station for transmission over the air interface or selective routing to the access point. In some embodiments, the gateway also counts bytes included in the downlink packets.

Figure 5:
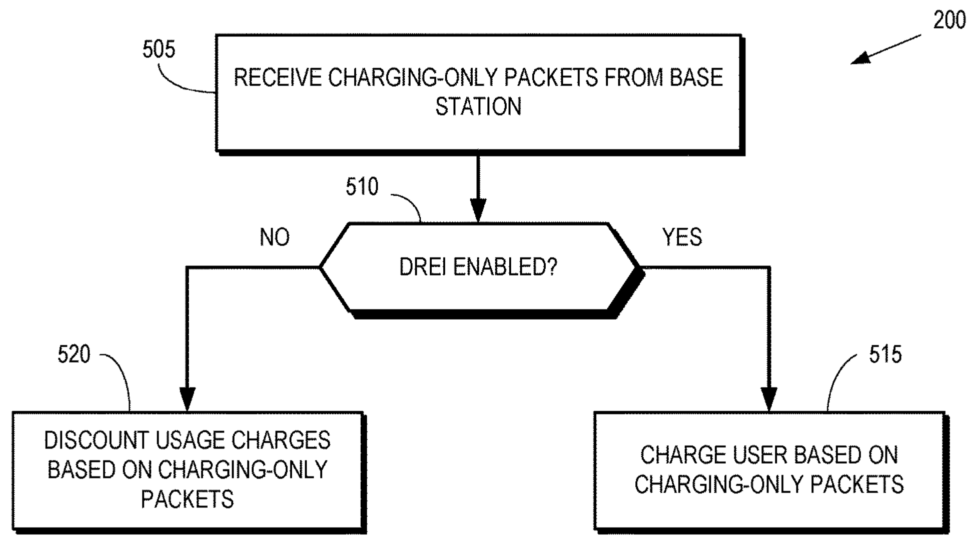
FIG. 5 is a flow diagram of a method of determining charging information at a gateway using charging-only packets received from a base station according to some embodiments.

FIG. 5 is a flow diagram of a method 500 of determining charging information at a gateway using charging-only packets received from a base station according to some embodiments. The method 500 may be implemented in some embodiments of the wireless communication system 100 shown in FIG. 1. Although charging-only packets are used to convey charging information between the base station and the gateway and the method 500 shown in FIG. 3, control messages or control signaling may also be used to convey this information, as discussed herein.

At block 505, the gateway receives the charging-only packets from the base station. At decision block 510, the gateway determines whether DREI is currently enabled or was enabled when the downlink packets corresponding to the charging-only packets were transmitted to the base station. If so, the gateway did not count the downlink packets (or the bytes in the downlink packets) that were provided to the base station. The gateway therefore determines usage charges for the user based on the charging-only packets at block 515. As discussed herein, different charging rates may be applied to the charging-only packets corresponding to downlink packets that were transmitted by the base station and the charging-only packets corresponding to downlink packets that were rerouted by the base station to an access point in a different network. If DREI is not enabled and the gateway counted the downlink packets (or the bytes in the downlink packets) before providing the downlink packets to the base station, the gateway may discount (at block 520) the usage charges for the user that were previously determined based on the downlink packets based on the charging-only packets received from the base station. For example, the gateway may generate a base charge for the user assuming that all the downlink packets provided to the base station are transmitted by the base station over the corresponding interface. The gateway may then reduce the base charge based on a number of charging-only packets (or a number of bytes indicated by the charging-only packets) that were rerouted to the access point in the other network.

Figure 6:
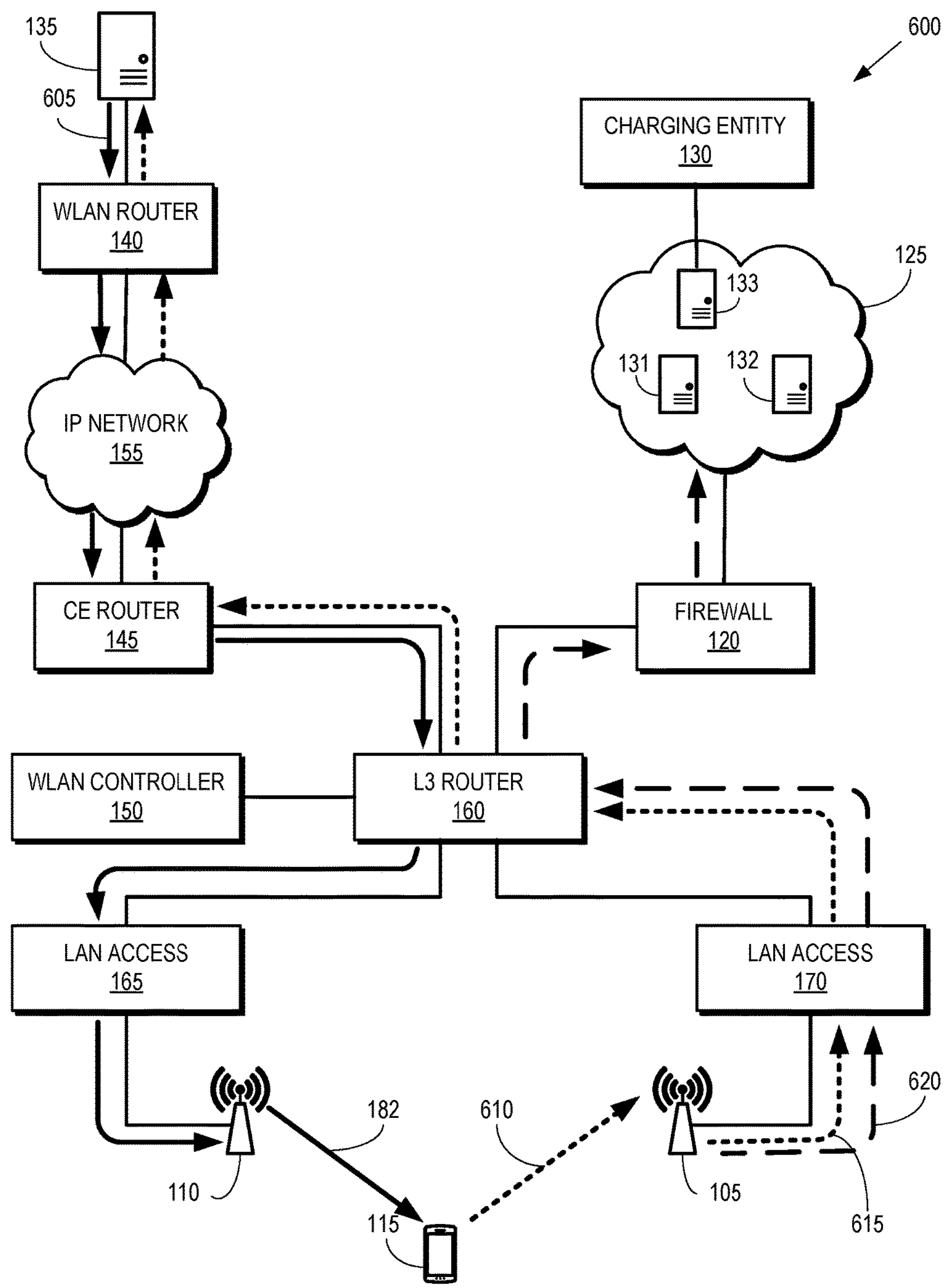
FIG. 6 is a block diagram of a wireless communication system that conveys uplink packets according to some embodiments.

FIG. 6 is a block diagram of a wireless communication system 600 that conveys uplink packets according to some embodiments. Entities in the wireless communication 600 that correspond to similar entities in the wireless communication system 100 are indicated using the same reference numerals as shown in FIG. 1. The application server 135 generates downlink packets that are addressed to the user equipment 115. The application server 135 provides the downlink packets to the user equipment via the Wi-Fi network, as indicated by the solid arrows 605 (only one of the solid arrows is indicated by a reference numeral in the interest of clarity). For example, the application server may provide the downlink packets to a WLAN router 140 that forwards the packets to a CE router 145 via the IP network 155. The CE router 145 transmits the downlink packets to the LAN access 165 via the L3 router 160. The access point 110 receives the downlink packets from the LAN access 165 and transmits the downlink packets to the user equipment 115 over the air interface 182.

In response to receiving the downlink packets, the user equipment 115 transmits one or more uplink packets over the air interface 610 to the base station 105 in the LTE network. Although the user equipment 115 transmits the uplink packets in response to receiving the downlink packets in the illustrated embodiment, some embodiments of the user equipment 115 may transmit uplink packets to the base station 105 without necessarily receiving any downlink packets from the access point 110. The base station 105 routes the uplink packets to the application server 135 via the Wi-Fi network, as indicated by the short dashed arrows 615 (only one of the short dashed arrows is indicated by a reference numeral in the interest of clarity). For example, the uplink packets may be routed to the L3 router 160 via the LAN access 170. The L3 router 160 may then route the uplink packets to the application server via the CE router 145, IP network 155, and WLAN router 140 in the Wi-Fi network.

Uplink packets that are received by the base station 105 over the air interface 610 consume resources of the LTE network. However, the uplink packets are not seen by the PDN gateway 133. Consequently, in order to charge users for the resources of the LTE network, the base station 105 transmits charging-only packets through the LTE network to the PDN gateway 133, as indicated by the long dashed arrows 620 (only one of the long dashed arrows is indicated by a reference numeral in the interest of clarity). For example, the charging-only packets may be transmitted to the L3 router 160 via the LAN access 170. The L3 router 160 may route the charging-only packets to the PDN gateway 133 via the firewall 120. Some embodiments of the charging-only packets may include information such as the information shown in the charging-only packets 200 illustrated in FIG. 2.

Some embodiments of the charging-only packets include information that indicates the QoS or the QCI of the uplink packets that were rerouted through the Wi-Fi network. For example, the charging-only packet corresponding to a rerouted uplink packet may include a 6-bit DSCP value in a field of an IP header of the uplink packet. For another example, the charging-only packet corresponding to the rerouted uplink packet may include a 32-bit TEID that is used to multiplex different connections into a GTP tunnel.

In some embodiments, the number of charging-only packets transmitted to the PDN gateway 133 may correspond to the number of uplink packets received by the base station 105 and rerouted into the Wi-Fi network. Each charging-only packet may therefore include information indicating the number of bytes in the corresponding uplink packets. Bandwidth in the wireless communication system 100 may be conserved by generating one charging-only packet to represent more than one uplink packet. Some embodiments of the base station 105 and the PDN gateway 133 negotiate a protocol that determines a scaling factor for mapping the charging-only packets to the uplink packets. For example, a scaling factor, $u<1$, may be defined so that the PDN gateway 133 maps each received charging-only packet to $1/u$ uplink packets that were received by the base station 105 over the air interface 610. The charging-only packet may also include information indicating the QoS or QCI of each of the uplink packets represented by the charging-only packet.

Instead of transmitting charging-only packets, the base station 105 may transmit other information that represents the uplink packets that were routed through the Wi-Fi network. In some embodiments, the base station 105 transmits control messages or control signaling to identify the rerouted downlink packets. For example, the base station 105 may transmit a control message such as the control message 205 shown in FIG. 2.

Figure 7:
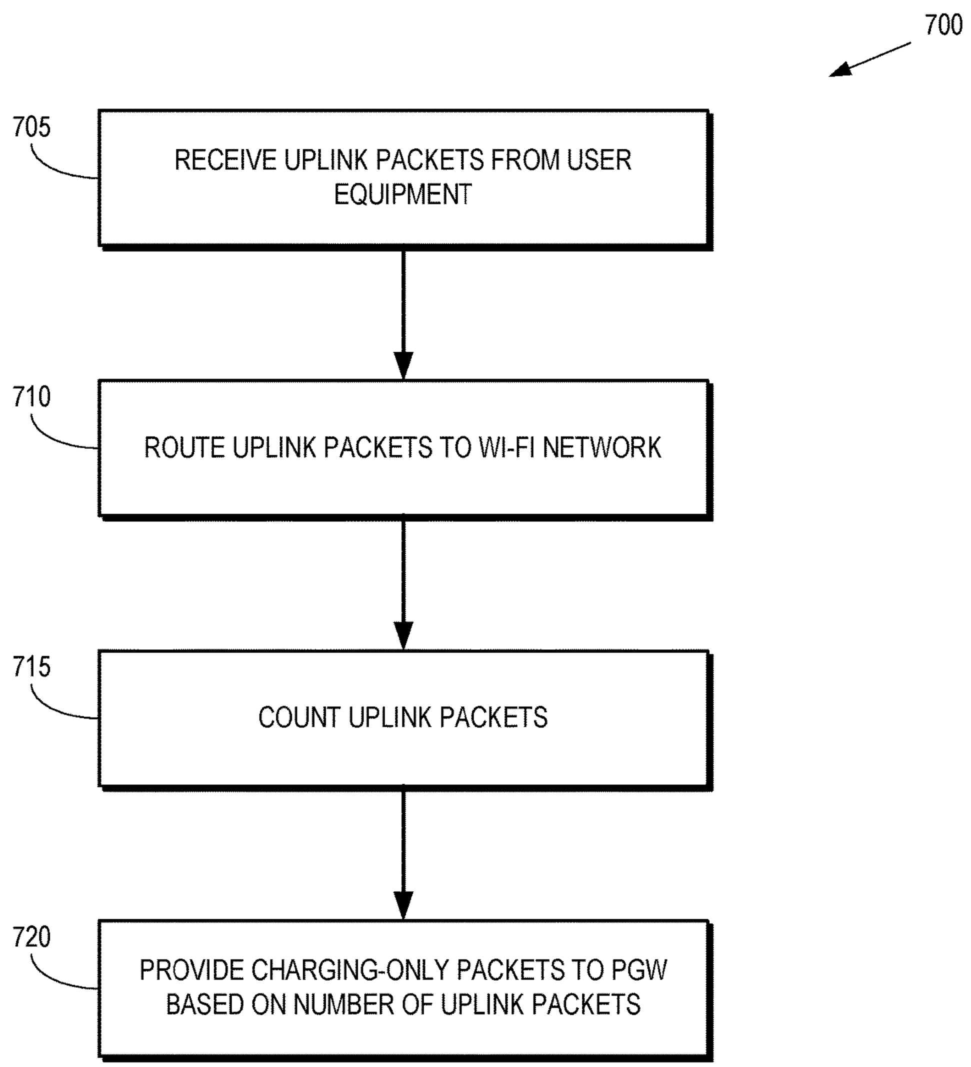
FIG. 7 is a flow diagram of a method of counting uplink packets at a base station and generating charging-only packets according to some embodiments.

FIG. 7 is a flow diagram of a method 700 of counting uplink packets at a base station and generating charging-only packets according to some embodiments. The method 700 may be implemented in some embodiments of the wireless communication system 600 shown in FIG. 6. Although charging-only packets are used to convey information corresponding to the uplink packets in the method 700 shown in FIG. 7, other information such as control messages or control signaling may be used to convey this information in some embodiments.

At block 705, the base station receives uplink packets from user equipment. At block 710, the base station routes the uplink packets into the Wi-Fi network, e.g., for transmission to an application server. At block 715, the base station counts the uplink packets that were routed into the Wi-Fi network. Some embodiments of the base station may also count the bytes conveyed in the uplink packets that were received from the user equipment and routed into the Wi-Fi network. At block 720, the base station generates charging-only packets based on the uplink packets that were routed into the Wi-Fi network and then provides the charging-only packets to a gateway. Some embodiments of the charging-only packets may include information that corresponds to the charging-only packets 200 shown in FIG. 2. As discussed herein, the gateway uses the received charging-only packets to generate charging information for the user equipment and provide the charging information to a charging entity.

Figure 8:
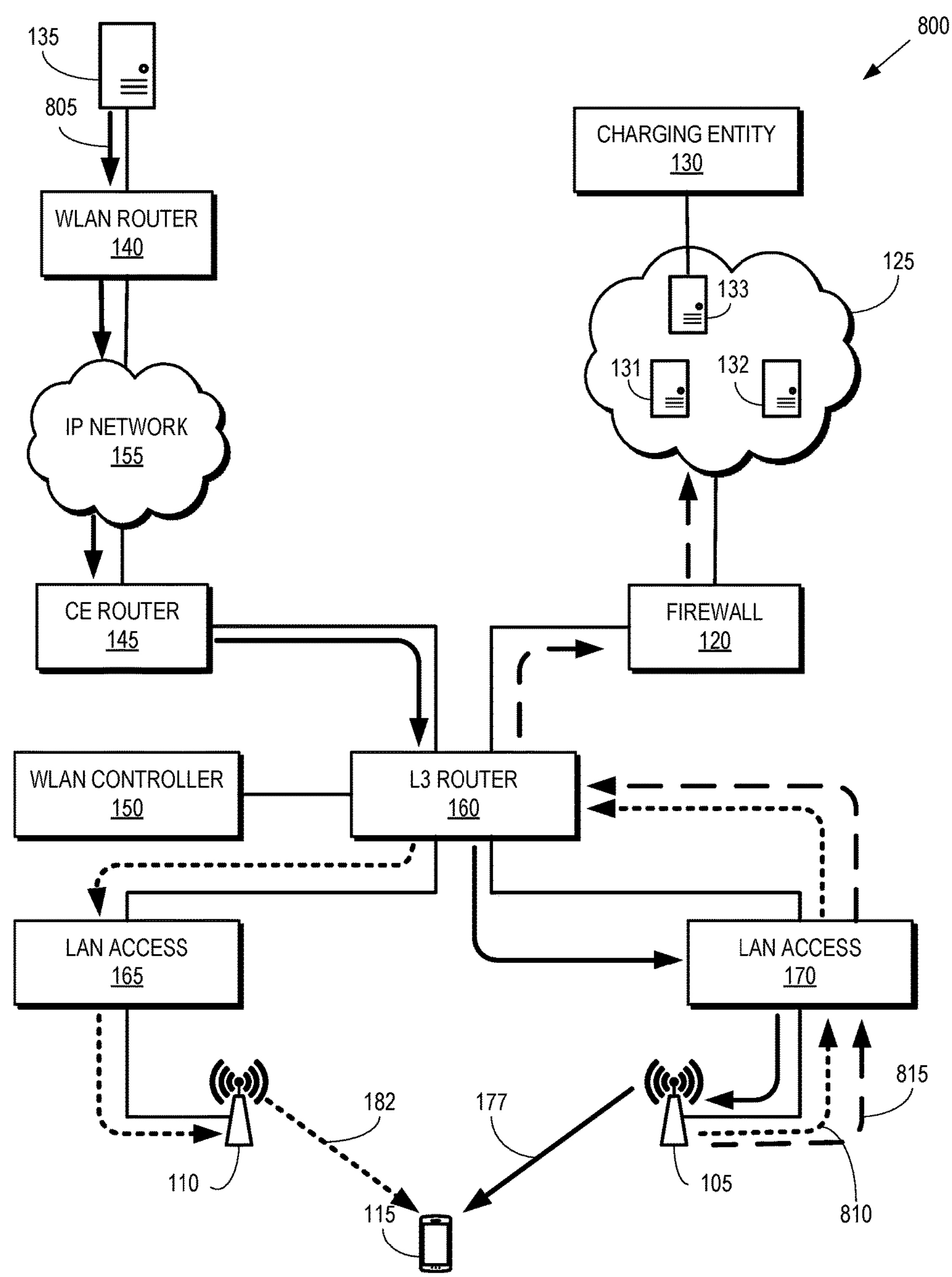
FIG. 8 is a block diagram of a wireless communication system that conveys downlink packets from a Wi-Fi network to an LTE network according to some embodiments.

FIG. 8 is a block diagram of a wireless communication system 800 that conveys downlink packets from a Wi-Fi network to an LTE network according to some embodiments. Entities in the wireless communication 800 that correspond to similar entities in the wireless communication system 100 are indicated using the same reference numerals as shown in FIG. 1. The application server 135 generates downlink packets that are addressed to the user equipment 115. However, the embodiment shown in FIG. 8 differs from the embodiment shown in FIG. 6 because the application server 135 provides the downlink packets to the user equipment via the LTE network, as indicated by the solid arrows 805 (only one of the solid arrows is indicated by a reference numeral in the interest of clarity). For example, the application server 135 may provide the downlink packets to a WLAN router 140 that forwards the packets to a CE router 145 via the IP network 155. The CE router 145 transmits the downlink packets to the LAN access 170 via the L3 router 160. The base station 105 receives the downlink packets from the LAN access 170.

The base station 105 may transmit all of the received downlink packets to the user equipment 115 over the air interface 177 or the base station may selectively transmit portions of the received downlink packets to the user equipment 115 over both the air interfaces 177, 182. For example, the base station 105 may provide a first portion of the downlink packets to the user equipment 115 over the air interface 177. The base station 105 may also route a second portion of the downlink packets to the access point 110 in the Wi-Fi network via the LAN accesses 165, 170, as indicated by the short dashed arrows 810 (only one of the short dashed arrows is indicated by the reference numeral in the interest of clarity). The access point 110 provides the second portion of the downlink packets to the user equipment over the air interface 182.

As discussed herein, usage costs for the resources of the LTE network (e.g., the air interface 177) may differ from the usage costs for the resources of the Wi-Fi network (e.g., the air interface 182). The base station 105 may therefore provide charging-only packets to the PDN gateway 133, as indicated by the long dashed arrows 815 (only one of the long dashed arrows as indicated by the reference numeral in the interest of clarity). The charging-only packets are used to indicate numbers of packets (or numbers of bytes) that are routed through the LTE network and the numbers of packets (or numbers of bytes) that are routed through the Wi-Fi network. Some embodiments of the charging-only packets include information indicating that the charging-only packet indicates charging information for a downlink packet that was routed through the Wi-Fi network, a byte count that indicates numbers of bytes in the rerouted packets, an identifier of the user equipment 115, and an expiry that causes the charging-only packet to expire after reception by the PDN gateway 133.

Some embodiments of the base station 105 may provide the charging-only packets (or other control information) to the PDN gateway 133 according to some embodiments described herein with respect to FIG. 1 or FIG. 3. In addition to or instead of the information transmitted in the charging-only packet 200 or the control message 205 shown in FIG. 2, some embodiments of the base station may provide information indicating whether the base station 105 received the downlink packets from the PDN gateway 133 or the application server 135, an identifier of the Wi-Fi network or the LTE network depending on whether the downlink packets were provided by the PDN gateway 133 or the application server 135, and the like.

Figure 9:
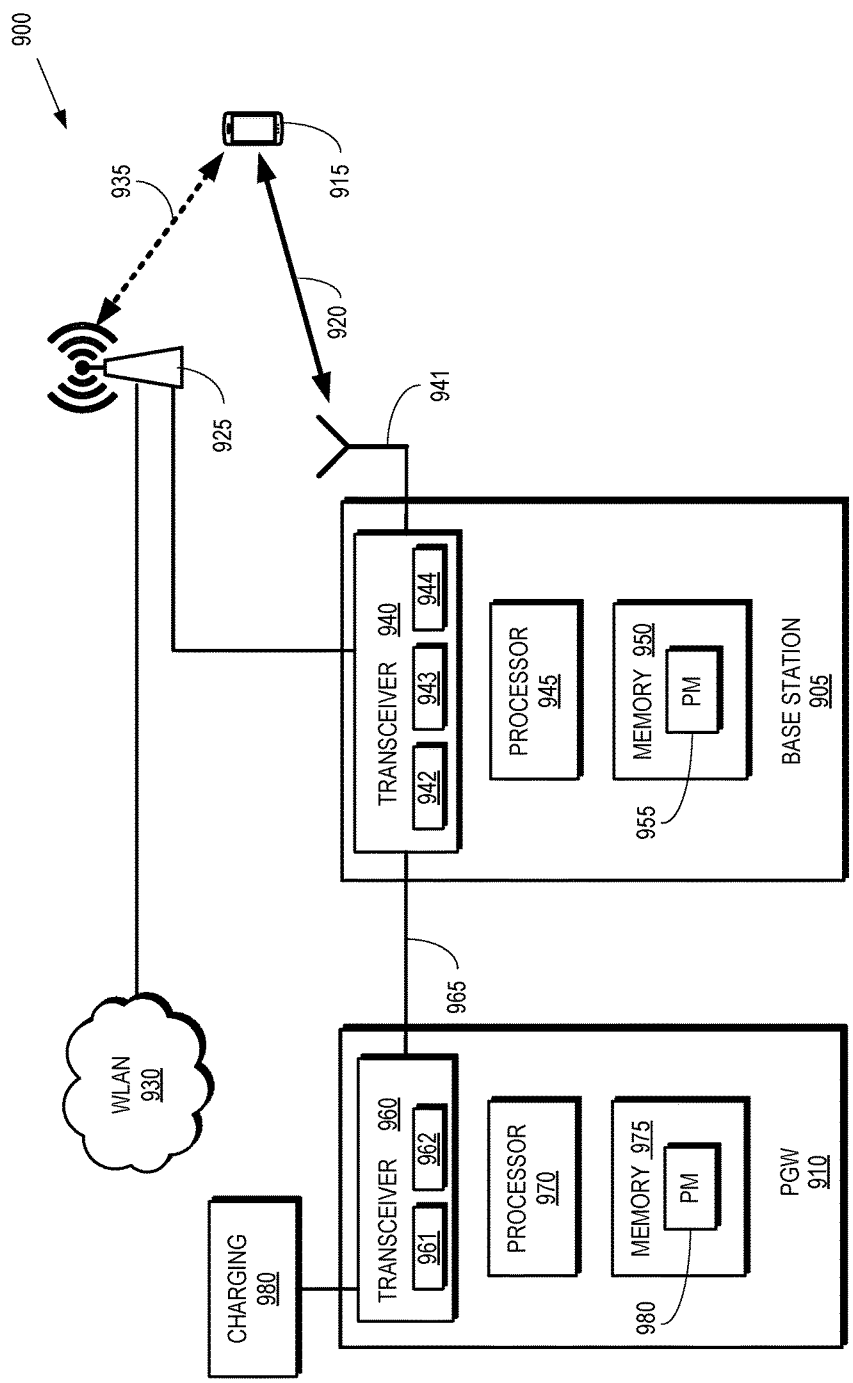
FIG. 9 is a block diagram of a wireless communication system that maintains PM counter values for unlicensed frequency bands according to some embodiments.

FIG. 9 is a block diagram of a wireless communication system 900 that maintains PM counter values for unlicensed frequency bands according to some embodiments. The communication system 900 includes a base station 905 and a PDN gateway 910 that are part of a LTE network that provides wireless connectivity to a user equipment 915 over an air interface 920. The wireless communication system 900 also includes an access point 925 and a WLAN 930 that are part of a Wi-Fi network that provides wireless connectivity to the user equipment 915 over an air interface 935. The base station 905, the PDN gateway 910, the user equipment 915, the access point 925, and the WLAN 930 may be used to implement some embodiments of the wireless communication system 100 shown in FIG. 1, the wireless communication system 600 shown in FIG. 6, or the wireless communication system 800 shown in FIG. 8.

The base station 905 includes a transceiver 940 for transmitting and receiving signals. Some embodiments of the transceiver 940 support multiple interfaces such as a first interface towards an LTE antenna 941, a second interface towards the access point 925, and a third interface towards the PDN gateway 910. The first, second, or third interfaces may be a direct link or an indirect link via one or more intermediate entities. To support the first interface, the transceiver 940 includes an LTE module 942 that supports an LTE baseband function, LTE access stratum functions, LTE protocols, and the like. To support the second interface, the transceiver 940 includes a WLAN module 943 that supports IP packet routing and the like. To support the third interface, the transceiver 940 includes a gateway interface module 944 that supports secure communications, e.g., according to IPSec protocols so that an IPSec tunnel may be established between the module 944 and the PDN gateway 910. The transceiver 940 may be implemented as a single integrated circuit (e.g., using a single ASIC or FPGA) or as a system-on-a-chip (SOC) that includes different modules for implementing the functionality of the transceiver 940.

The base station 905 also includes a processor 945 and a memory 950. The processor 945 may be used to execute instructions stored in the memory 950 and to store information in the memory 950 such as the results of the executed instructions. The memory 950 in the base station 905 also implements a set of performance counters 955 for storing values representative of numbers of uplink or downlink packets that are routed through the LTE network and numbers of uplink or downlink packets that are routed through the Wi-Fi network. The transceiver 940, the processor 945, and the memory 950 may therefore be configured to implement some embodiments of the method 300 shown in FIG. 3 and the method 700 shown in FIG. 7.

The PDN gateway 910 includes a transceiver 960 for transmitting and receiving signals, such as signals received from the transceiver 940 over an interface 965. Some embodiments of the transceiver 960 support a first interface towards the base station 905 and a second interface towards a charging entity 980 that uses a set of rules, policies, and procedures to charge the owner of the user equipment 915 for resources of the air interface that are consumed by uplink or downlink packets. To support the first interface, the transceiver 960 includes a gateway interface module 961 that supports secure communications, e.g., according to IPSec protocols so that an IPSec tunnel may be established between the module 961 and the base station 905. To support the second interface, the transceiver 960 includes an OAM module 962 that supports transfer of charging information such as online charging data records, off-line charging data records, and the like. The transceiver 960 may be implemented as a single integrated circuit (e.g., using a single ASIC or FPGA) or as a system-on-a-chip (SOC) that includes different modules for implementing the functionality of the transceiver 960.

The PDN gateway 910 also includes a processor 970 and a memory 975. The processor 970 may be used to execute instructions stored in the memory 975 and to store information in the memory 975 such as the results of the executed instructions. The memory 975 also implement storage for performance counters 980, which may be used to store values representative of numbers of downlink packets that are provided to the base station 905, numbers of uplink packets that are received from the base station 905, numbers of uplink or downlink packets routed through the LTE network by the base station 905, and the numbers of uplink or downlink packets routed through the Wi-Fi network by the base station 905. The transceiver 960, the processor 970, and the memory 975 may therefore be used to implement some embodiments of the method 400 shown in FIG. 4, the method 500 shown in FIG. 5, and the method 700 shown in FIG. 7.

At least parts of the wireless communication system 900 including the base station 905, the PDN gateway 910, or the access point 925 may be implemented using network function virtualization (NFV), which is a network architecture that makes use of technologies of computer virtualization. In an NFV architecture, entities such as the base station 905, the PDN gateway 910, or the access point 925 or parts thereof or part of their functions can be virtualized using software building blocks that may connect, or interact, to create communication services. A virtualized network function of, e.g. the base station 805, the PDN gateway 910, or the access point 925, may include at least one virtual machine running different software and processes, on top of standard high-volume servers, switches and storage, or a cloud computing infrastructure, instead of having customized hardware appliances for each network function. As such a base station function may be implemented using a computer program product embodied on a non-transitory computer readable medium for performing operations. The computer program product may include instructions, that when executed by a processor, perform the operations of the specific base station function. A radio interface of a base station or a radio interface of an access point may be located in one location and corresponding processing functions can be located at a remote location. The entities at the different locations may be connected via optical links or other wired or wireless communication links. Base stations or access points that implement radio interfaces and corresponding processing functions at different locations may be referred to as distributed base stations or access points.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

A computer readable storage medium may include any storage medium, or combination of storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:

receiving packets at a base station in a first network that operates according to a first radio access technology (RAT);

selectively routing a portion of the packets towards at least one second network that operates according to at least one second RAT that is different than the first RAT;

counting at least one of a first number of downlink packets that are received from a gateway and transmitted from the base station to a user equipment and a second number of downlink packets that are received from the gateway and routed towards the at least one second network to at least one access point for transmission to the user equipment;

determining whether the gateway is operating in at least one of:

a first mode in which the gateway counts downlink packets that are transmitted to the base station, a second mode in which the gateway does not count downlink packets that are transmitted to the base station, and a third mode in which downlink packets are generated in the at least one second network and bypass the gateway in the first network; and transmitting, to the gateway that conveys uplink packets and downlink packets in the first network, charging-only packets including information indicating a number of packets in the portion of the packets, wherein the charging-only packets are not propagated beyond the gateway, wherein transmitting the information indicating the number of packets comprises:

transmitting information indicating the second number of downlink packets in response to determining that the gateway is operating in the first mode; and transmitting information indicating the first number and the second number of downlink packets in response to determining that the gateway is operating in at least one of the second mode and the third mode.

2. The method of claim 1, wherein information indicating the number of packets comprises charging-only packets that the charging-only packets include information indicating at least one of a user to be charged for transmission of the packets, a quality-of-service (QoS) of the portion of the packets, a byte count that indicates a number of bytes in each packet in the portion of packets, an identifier of user equipment that transmits or receives the portion of the packets, and an expiry that causes the packet to expire after reception by the gateway.

3. The method of claim 1, wherein the information indicating the number of packets comprises control messages or control signaling that include information indicating at least one of whether the portion of the packets include uplink packets or downlink packets, whether the portion of the packets is routed towards the first network that operates according to the first RAT or the at least one second network that operates according to the at least one second RAT, a user to be charged for transmission of the packets, a byte count that indicates a number of bytes in each packet in the portion of packets, an identifier of a QOS associated with the portion of the packets, and an identifier of user equipment that transmits or receives the portion of the packets.

4. The method of claim 1, further comprising:

counting a third number of uplink packets that are received at the base station from a user equipment and routed towards the at least one second network.

5. The method of claim 4, wherein transmitting the information indicating the number of packets comprises transmitting information indicating the third number of uplink packets.

6. A method comprising:

transmitting a first number of downlink packets towards a base station;

receiving, from the base station at a gateway that conveys uplink packets and downlink packets in a first network that operates according to a first radio access technology (RAT), charging-only packets including information indicating a number of packets in a portion of packets that the base station routes towards at least one second network that operates according to at least one second RAT that is different than the first RAT, wherein the charging-only packets are not propagated beyond the gateway, wherein receiving the information indicating the number of packets comprises:

receiving information indicating a second number of downlink packets that the base station routed towards the at least one second network when the gateway is operating in a first mode in which the gateway counts downlink packets that are transmitted to the base station; and receiving information indicating a first number of downlink packets that the base station transmits to user equipment and the second number of downlink packets in response to determining that the gateway is operating in a second mode in which the gateway does not count downlink packets that are transmitted to the base station;

determining charging information based on the information indicating the number of packets; and transmitting the charging information to a charging entity in the first network.

7. The method of claim 6, wherein the information indicating the number of packets comprises charging-only packets that charging-only packets include information indicating at least one of a user to be charged for transmission of the packets, a quality-of-service (QoS) of the portion of the packets, a byte count that indicates a number of bytes in each packet in the portion of packets, an identifier that indicates whether the base station received the packets from the first network or the at least one second network, an identifier of user equipment that transmits or receives the portion of the packets, and an expiry that causes the packet to expire after reception by the gateway.

8. The method of claim 6, wherein the information indicating the number of packets comprises control messages or control signaling that include information indicating at least one of whether the portion of the packets include uplink packets or downlink packets, whether the portion of the packets is routed towards the first network that operates according to the first RAT or the at least one second network that operates according to the at least one second RAT, whether the base station received the downlink packets from the gateway in the first network or an application server in the at least one second network, a user to be charged for transmission of the packets, a byte count that indicates a number of bytes in each packet in the portion of packets, a QOS associated with the portion of the packets, and an identifier of user equipment that transmits or receives the portion of the packets.

9. The method of claim 6, wherein receiving the information indicating the number of packets comprises receiving information indicating a third number of uplink packets that are received at the base station from a user equipment and routed towards the at least one second network by the base station.

10. An apparatus configured for operation in a first network that operates according to a first radio access technology (RAT), the apparatus comprising:

a transceiver configured to receive packets comprising at least one of uplink packets and downlink packets; and a processor configured to selectively route a portion of the packets towards at least one second network that operates according to at least one second RAT that is different than the first RAT, wherein the transceiver is configured to transmit, towards a gateway that conveys uplink packets and downlink packets in the first network, charging-only packets including information indicating a number of packets in the portion of the packets, wherein the charging-only packets are not propagated beyond the gateway, wherein the processor is configured to count at least one of a first number of downlink packets that are received from the gateway and transmitted by the transceiver to a user equipment and a second number of downlink packets that are received from the gateway and routed towards the at least one second network for provision to at least one access point for transmission to the user equipment, and wherein the processor is configured to determine whether the gateway is operating in at least one of:

a first mode in which the gateway counts downlink packets that are received by the apparatus;

a second mode in which the gateway does not count downlink packets that are transmitted by the transceiver; and a third mode in which downlink packets are generated in the at least one second network and bypass the gateway in the first network, wherein the transceiver is configured to:

transmit information indicating the second number of downlink packets in response to determining that the gateway is operating in the first mode; and transmit information indicating the first number and the second number of downlink packets in response to determining that the gateway is operating in at least one of the second mode and the third mode.

11. The apparatus of claim 10, wherein the processor is configured to generate charging-only packets that indicate charging-only packets include information that indicates the number of packets in the portion of the packets, wherein the charging-only packets comprises comprise information indicating at least one of a user to be charged for transmission of the packets, a quality-of-service (QoS) of the portion of the packets, a byte count that indicates a number of bytes in each packet in the portion of packets, at least one identifier of the at least one second network for uplink packets that are routed towards the at least one second network, an identifier of user equipment that transmits or receives the portion of the packets, and an expiry that causes the packet to expire after reception by the gateway.

12. The apparatus of claim 10, wherein the processor is configured to generate control messages or control signaling that indicate the number of packets in the portion of the packets, wherein the control messages or control signaling comprise information indicating at least one of whether the portion of the packets include uplink packets or downlink packets, whether the portion of the packets is routed towards the first network that operates according to the first RAT or the at least one second network that operates according to the at least one second RAT, whether downlink packets are received by the base station from the gateway in the first network or an application server in the at least one second network, at least one identifier of the at least one second network for uplink packets that are routed towards the at least one second network, a user to be charged for transmission of the packets, a byte count that indicates a number of bytes in each packet in the portion of packets, and an identifier of user equipment that transmits or receives the portion of the packets.

13. The apparatus of claim 10, wherein the processor is configured to count a third number of uplink packets that are received at the base station apparatus from a user equipment and routed towards the at least one second network, and wherein the transceiver is configured to transmit information indicating the third number of uplink packets.

14. An apparatus configured to operate convey uplink packets and downlink packets in a first network according to a first radio access technology (RAT), the apparatus comprising: a processor; and a transceiver configured to:

receive, via a first interface, charging-only packets including information from a base station indicating a number of packets in a portion of packets that the base station routes towards at least one second network that operates according to at least one second RAT that is different than the first RAT, wherein the charging-only packets are not propagated beyond the apparatus, transmit a first number of downlink packets to the base station, receive information indicating a second number of downlink packets that the base station routed towards the second network when the processor is operating in a first mode in which the processor counts downlink packets that are transmitted to the base station; and receive information indicating a first number of downlink packets that the base station transmits to user equipment and the second number of downlink packets in response to determining that the processor is operating in at least one of a second mode in which the processor does not count downlink packets that are transmitted to the base station and a third mode in which downlink packets are generated in the at least one second network and bypass the apparatus in the first network; and wherein the processor is configured to determine charging information based on the information indicating the number of packets, wherein the transceiver is configured to transmit the charging information via a second interface to a charging entity in the first network.

15. The apparatus of claim 14, wherein the information indicating the number of packets comprises charging-only packets that indicate charging-only packets include information that indicates the number of packets, wherein the charging-only packets comprise information indicating at least one of a user to be charged for transmission of the packets, a quality-of-service (QoS) of the portion of the packets, a byte count that indicates a number of bytes in each packet in the portion of packets, an identifier of user equipment that transmits or receives the portion of the packets, and an expiry that causes the packet to expire after reception by the transceiver.

16. The apparatus of claim 14, wherein the information indicating the number of packets comprises control messages or control signaling that indicate the number of packets in the portion of the packets, wherein the control messages or control signaling comprise information indicating at least one of whether the portion of the packets include uplink packets or downlink packets, whether the portion of the packets is routed towards the first network that operates according to the first RAT or the at least one second network that operates according to the at least one second RAT, a user to be charged for transmission of the packets, a byte count that indicates a number of bytes in each packet in the portion of packets, and an identifier of user equipment that transmits or receives the portion of the packets.

17. The apparatus of claim 14, wherein the transceiver is configured to receive information indicating a third number of uplink packets that are received at the base station from a user equipment and routed towards the at least one second network by the base station.

* * * * *